Sept. 2, 1969          R. W. SHOUP ET AL        3,464,350
BED AND PLATEN NUMBERING MACHINE FOR FEEDING, PRINTING
AND SEVERING ASSOCIATED WEBS
Filed April 14, 1967                          9 Sheets-Sheet 1

INVENTORS
ROBERT W. SHOUP
ROGER F. WHITE
ALBERT E. WELLER
Hopgood & Calimafde
ATTORNEYS United States Patent Office 3,464,350
Patented Sept. 2, 1969

3,464,350
BED AND PLATEN NUMBERING MACHINE FOR FEEDING, PRINTING AND SEVERING ASSOCIATED WEBS
Robert W. Shoup, Wyckoff, Roger F. White, Paramus, and Albert E. Weller, Glen Rock, N.J., assignors to Autographic Business Forms, Inc., a corporation of New Jersey
Filed Apr. 14, 1967, Ser. No. 630,991
Int. Cl. B41l 45/12; B41j 1/38
U.S. Cl. 101—78                                13 Claims

ABSTRACT OF THE DISCLOSURE

The invention contemplates an intermittent-type printing mechanism transiently operative on continuously moving web material, which may be single-ply or a collated plurality of plies. Printing action takes place immediately before cut-off and is of a nature to apply dry magnetic-ink characters to the top ply (original), while assuring the same information content in the impressions made on lower plies. The printed characters reflect numerical sequencing, assuring coordinated serialization of all parts of each separate set. Reliance is placed on a slight degree of looseness in the synchronized retention of positioning control for the web, such looseness developing in the web substantially at or just prior to its reaching the locale of print action, such that transient print action (accompanied by localized transient arrest of web motion) is inoperative to impair the effectively uniform continuous flight of the web from the time of positive-feed engagement, through the printing region, and up to the point of cut-off.

---

This invention relates to a printing machine of the type wherein progressively changing printed information is applied to rapidly moving stock, in multiple parts which are to be delivered in properly collated and separated groups, each group having the same printed information. Specifically, for each group, the original (or top part) may be inscribed with magnetic-ink characters, and the other part or parts may be non-magnetically inscribed.

In the production of business documents known as unit sets (e.g., separable multiple-part sets, sometimes called snap-outs), as for example printed dividend checks, voucher checks, travelers checks, transfer checks, money orders, and the like, it is a customary requirement that each check and all its copy parts be correctly serialized and otherwise uniquely characterized for the particular transaction involved; and to conform to present standards of the American Bankers' Association, the "original" (e.g., the check itself) must be printed with magnetic ink in so-called MICR indicia, for magnetic coding to enable automatic check-sorting.

Documents of the character indicated are usually identified by consecutive numbers, each number being in common for all copies of the multiple-part set. Documents are typically numbered twice, once with a conventional "Gothic" (Arabic) number for visual recognition using standard non-magnetic printing ink, and additionally with the magnetic MICR number for automatic sorting. The "Gothic" consecutive number may be individually printed on each copy of the set as paper webs pass through the printing press, prior to collating, and using conventional numbering machines; alternatively, such numbers may be crash-printed through the entire form set at the same time that paper and carbon webs are collated.

Until now, the magnetic consecutive (MICR) number, which must match the "Gothic" number, has been individually printed onto one or more of the paper webs as they pass through the printing press, or this (MICR) number has been added to the paper in a separate operation, prior to collating the forms. In either case, the problem of matching numbers on the collating machine is extremely difficult, and is subject to a high percentage of waste. Further wasteful expense is entailed by the banks, should there have been a miscollation of plies or a gap in the serializing of documents supplied by the manufacturer. Also, inspection procedures initiated by printers to guard against such failures are a significant factor in manufacturing cost, and they are still subject to human error.

Although it has been generally recognized that the ideal occasion to number forms in order to minimize the foregoing difficulties is during the collating process, and just prior to the instant they are deposited onto a conveyor as individual (separate) completed sets, there has not been available an acceptable means of printing the MICR number at this stage of the process.

It is accordingly an object of the invention to provide an improved means for producing multiple-part collated sets including a magnetically coded impression on at least one part thereof.

Another object is to meet the above object with a device in which all collated parts are uniquely serialized consistent with serialized MICR-printing of at least one part.

It is also an object to achieve the foregoing objects as part of the collating process.

It is a specific object to achieve the above objects in a collating machine which operates on continuous supplies of web material to constitute each part, which cuts off collated multiple parts into separate sets, and which achieves the MICR-printing of consecutive serial numbers, with assured consistency of serial numbers for all parts of each set, after collation and immediately prior to cut off.

Another specific object is to provide an improved intermittent-printing machine operable on continuously moving web material which is cut-off so immediately after printing that it cannot be subject to coordinated web-feeding in the region between printing and cut-off.

Still another specific object is to provide a printing-unit which can be installed in-line in a continuous web-flight collating apparatus and which will serially number collated sets, with magnetic ink and MICR characters, the top part (original) meeting American Bankers' Association standards as to quality, including automatic magnetic readability.

It is a general object to meet the foregoing objects with mechanism which will enable elimination of waste hitherto due to lack of correct serializing of consecutive sets or to non-registration of serial numbers in given sets, which will reduce to a minimum the wastage of stock involved in producing a given production order for serialized multiple-part sets, and which with simple operator adjustments permits fast set-up for economical and convenient volume production of highest quality end products.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Briefly stated, the invention contemplates an intermittent-type printing mechanism transiently operative on continuously moving web material, which may be single-ply or a collated plurality of plies. Printing action takes place immediately before cut-off and is of a nature to apply dry magnetic-ink characters to the top ply (original), while assuring the same information content in the impressions made on lower plies. The printed characters reflect numerical sequencing, assuring coordinated serialization of all parts of each separate set. Reliance is placed on a slight degree of looseness in the synchronized retention of positioning control for the web, such looseness developing in the web substantially at or just prior to its reaching the locale of print action, such that transient print action (accompanied by localized transient arrest of web motion) is inoperative to impair the effectively uniform continuous flight of the web from the time of positive-feed engagement, through the printing region, and up to the point of cut-off. The mechanism is described in connection with a high-speed collating machine, and various convenience and adjustment features are disclosed.

General organization

Figure 1:
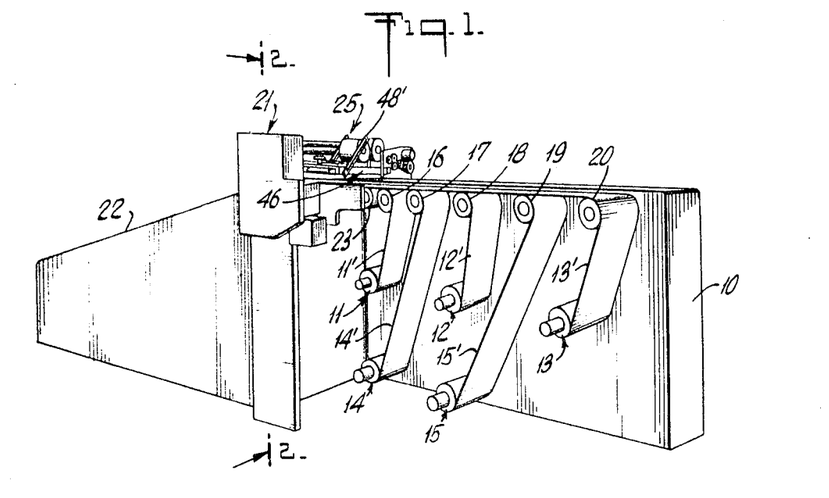
FIG. 1 is a simplified overall perspective view of a multiple-part collating machine incorporating printing mechanism of the invention as an in-line function immediately prior to cut-off of collated multiple-part sets.

FIG. 1 shows a collator machine to which print mechanism of the invention has been applied, and the aspect of FIG. 1 is from the side of the operator, with work flow proceeding right-to-left in the sense of the drawing. The collator includes an upstanding frame 10 which on its side supports a plurality of sets of spindles for handling continuous web for each of the plies of the ultimately collated material. Thus, printed stock or stock (11'–12'–13') to be printed may be carried at plural-support spindles 11–12–13, the last one of these, namely, 13, being the one which carries the top-ply stock 13'. Between the plies delivered from spindles 11–12–13 is further sheet material which may be carbon paper 14'–15' from appropriate spindles 14–15. All plies of material pass over aligned rollers 16–17–18–19–20 to permit matched collation and assembly in the plane of printing and ultimate cut-off. Cut-off occurs at a station designated generally 21, and may comprise a rotary cutter mechanism of conventional construction, which therefore needs no detailed description. The cut-off collated items may be picked up and stacked by conventional means suggested by the collector assembly 22 at the left end of the machine.

It will be understood that during the process of collation, marginal edges of the stock being collated may be lightly fastened together at spaced points by conventional techniques, as by glue, pierced tabs of paper, or the like. The mechanism for performing such fastening forms no part of the invention and is therefore not shown.

Basic drive in the collator is accomplished by a collator web-feed drum 23 mounted beneath and tagent to the plane of collated paper support. Drum 23 may be driven at a constant speed by basic drive mechanism contained within or supported on the other side of the frame 10, and therefore not shown in FIG. 1; the basic drive is merely suggested at 9 in FIG. 8. The collated stock is of the variety having registered drive-sprocket apertures along one or both edges thereof, the apertures for all plies being aligned (in registration) when the material is collated. To assure this condition, the collator web-feed drum 23 is equipped with drive pins suitably spaced for these apertures, as at 24 (see FIGS. 3 and 8). Preferably also, the rolls 16–17–18–19–20 for the individual plies (11'–14'–12'–15'–13') are similarly provided with drive pins (not shown), and these rolls are all driven in synchronism with drum 23.

The printing operation of the invention occurs between the location of drum 23 and the cut-off location 21. In the case of FIG. 1, such mechanism is merely schematically indicated at 25, but further detail as to its particular location can be seen in FIG. 3, where both the collator web-feed drum 23 and the rotary-knife mechanism of the cut-off head 21 will be recognized.

Figure 3:
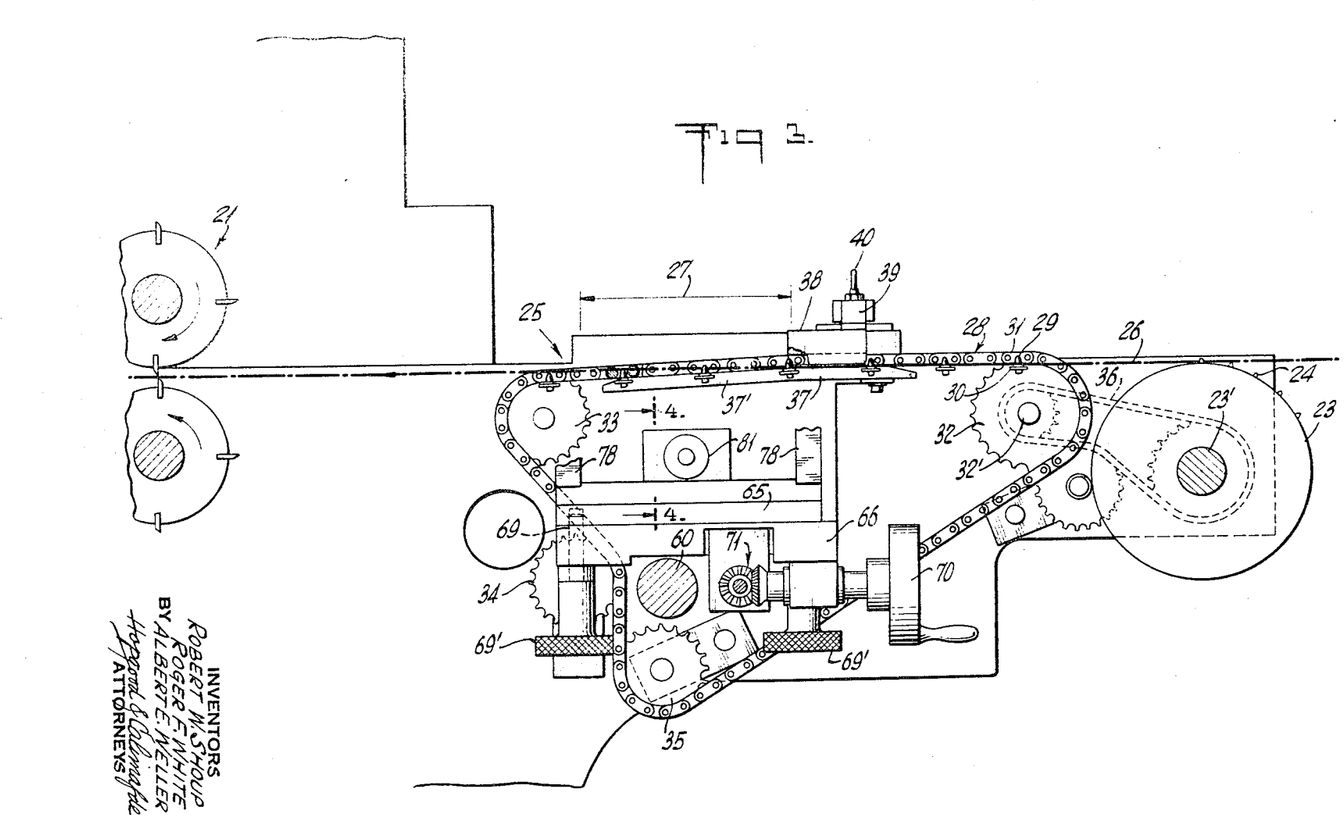
FIG. 3 is a front-elevation view of part of the mechanism of FIG. 2, in conjunction with web-feeding and cut-off parts of the collating machine.

In FIG. 3, the heavy phantom alignment 26 suggests the collated web and its alignment. The printing mechanism 25 is intermittently operative to produce the printing impression at selected locations in the region 27, and control of web-feed to and through this region is accomplished by feed pins unique to the printing mechanism but nevertheless synchronized with the advance of web-feed drum 23. The particular drive for feeding the web through the print region utilizes an endless sprocket chain 28, to suitably spaced links of which are affixed tapered feed-pins, as at 29, on an off-set support lug 30 carried by link 31. The alignment of the sprocket chain 28 is, in the form shown, on the far side of the collated web, i.e., away from the operator. It runs from a main drive sprocket 32, longitudinally to a first idler sprocket 33 and via successive further idler sprockets 34–35, to determine a course which will avoid other elements of the mechanism. Synchronized connection of this feed-sprocket chain to the collator drum feed 23 is achieved by a further sprocket connection 36 between the shafts 23'–32', for drum 23 and sprocket 32, respectively.

It is a feature of the invention that localized control of the web by way of the sprocket pins (such as pin 29) shall change from a positive condition of full-engagement with the marginal apertures on the web, substantially at or just prior to printing, to a progressively lessening degree of engagement, culminating in total loss of pin engagement with the web substantially at the close of the print region 27.

Figure 2:
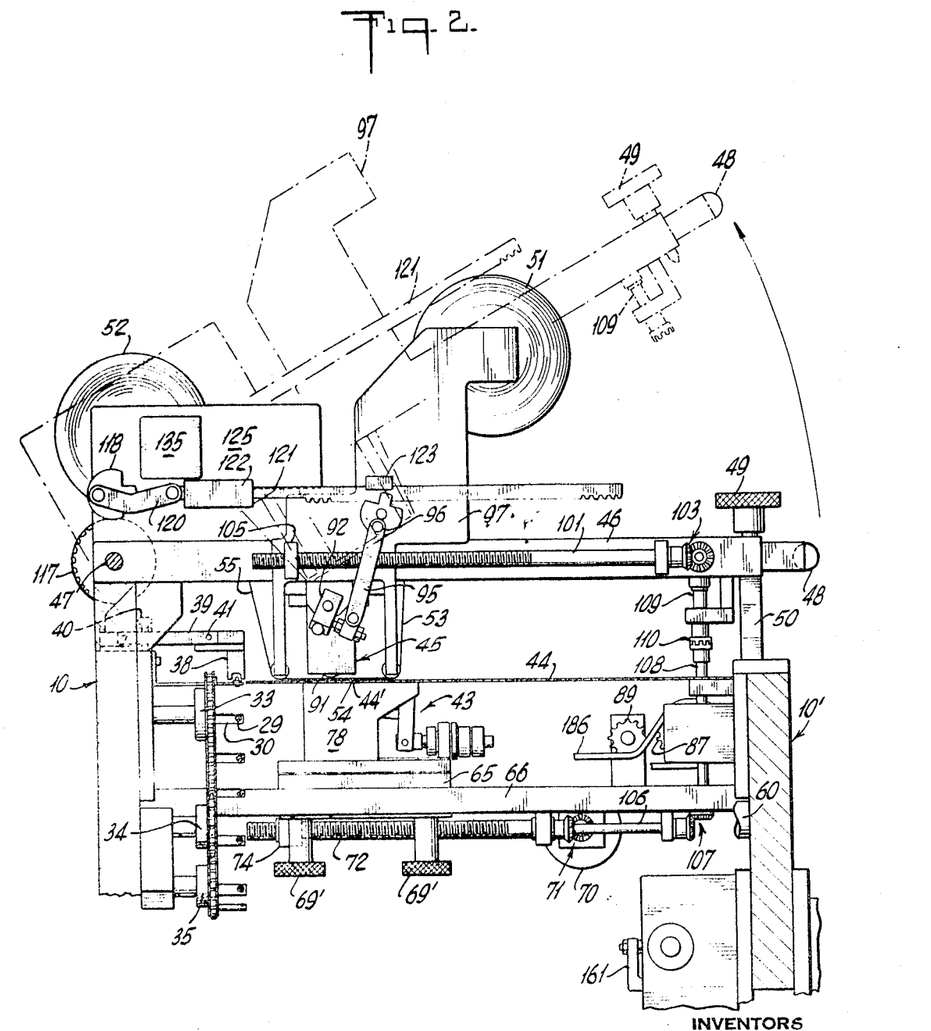
FIG. 2 is an enlarged side-elevation view of the printing mechanism of FIG. 1, as seen in the direction left-to-right, from the plane 2—2 of FIG. 1, located between the print and cut-off positions on the collating machine.

In the form shown, this is achieved by riding the top horizontal span of chain 28 over a profiled shoe, having a first or upper horizontal portion 37 sufficiently elevated to assure full engagement of pins 29 with the web apertures, as long as the elevation for portion 37 applies. Thereafter, the shoe includes a down-ramp 37' inclined slightly below the elevation of the lead portion 37; preferably, the slope of ramp 37' commences substantially at or just prior to entry into the print region 27. The alignment of chain 28 along the down-ramp 37' is such as to assure tangential pick-up of the chain 28 over idler sprocket wheel 33. To assure full registration of all web apertures for each pin engagement over the horizontal part of the shoe 37, we provide a top-guide 38 in the form of a channel, straddling both lateral sides of the path of movement of the pins 29 and holding all plies of the web to the base of the feed-pins 29. In FIG. 2, the guide 38 is seen to be supported on bracket means 39, referenced to the frame 10, and having provision for suitable adjustment at 40–41, depending upon particular job requirements.

It will be appreciated that by reason of the tapered profile of pins 29, these pins are gradually withdrawn from the web-feed apertures as sprocket 28 follows the down-ramp 37', and that this withdrawal correspondingly effects a predetermined progressive slack or looseness in the control of the web throughout the print region 27.

It has been generally indicated that the print mechanism of the invention is of the type which operates intermittently (i.e., not a rotary print mechanism), and which must, therefore, transiently arrest web movement in order to make a print impression. Of course, the transient nature is extremely brief and according to the invention, the accurate transfer of print impression on all plies of the collated web is made possible by means of the controlled degree of slack which is achieved in the web through the disappearing sprocket-pin arrangement just described for the region 27.

The basic printing mechanism in the form shown employs a print-hammer module, designated generally 43 (FIG. 2) located beneath the plane of web support, which in FIG. 2 is shown to be provided by a table or sheet-metal plate 44, having an opening 44' through which the print-hammer may strike against a print-head or character unit located above the plane of web support.

The print-head unit in FIG. 2 is designated generally 45; it is carried on a rugged horizontal frame 46 hingedly supported at 47 to the back side of the machine frame 10 (i.e., on the side away from the operator). This frame for the print-head 45 is actuable to an elevated position suggested by phantom outline in FIG. 2, there being provided a handle 48 for convenience in achieving the elevated position, and props (as at 48', FIG. 1) to hold an elevated position, for set-up or other purposes; clamp means 49 secures the frame 46 in its normally down position, as shown in solid lines in FIG. 2. Of course, when thus secured, the free end of the frame 46 rests upon an upstanding part 50 of the machine frame, and it is to this part 50 that the adjustment bolt of clamp 49 is engaged in the down-position. The hinged upper frame 46 for the print-head 45 also carries ribbon supply feed and take-up mechanism, designated generally 51 for the supply reel, 52 for the take-up reel, and guided over idlers so as to stretch at 53–54–55 around and beneath the print-head 45, the lower stretch 54 being preferably immediately adjacent the collated plies of web and spanning the area of print-impression transfer.

Figure 8:
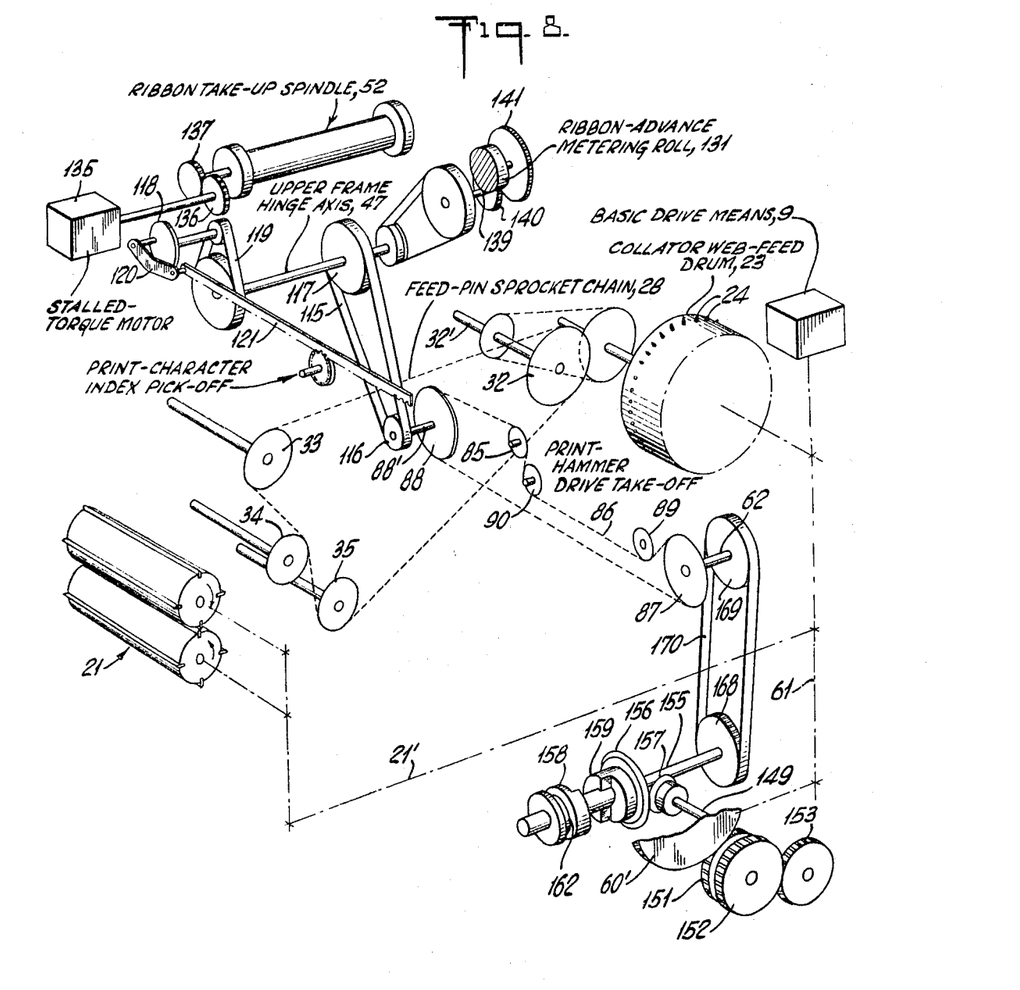
FIG. 8 is a simplified isometric view diagrammatically depicting drive trains and connections for mechanism of the invention.
Figure 9:
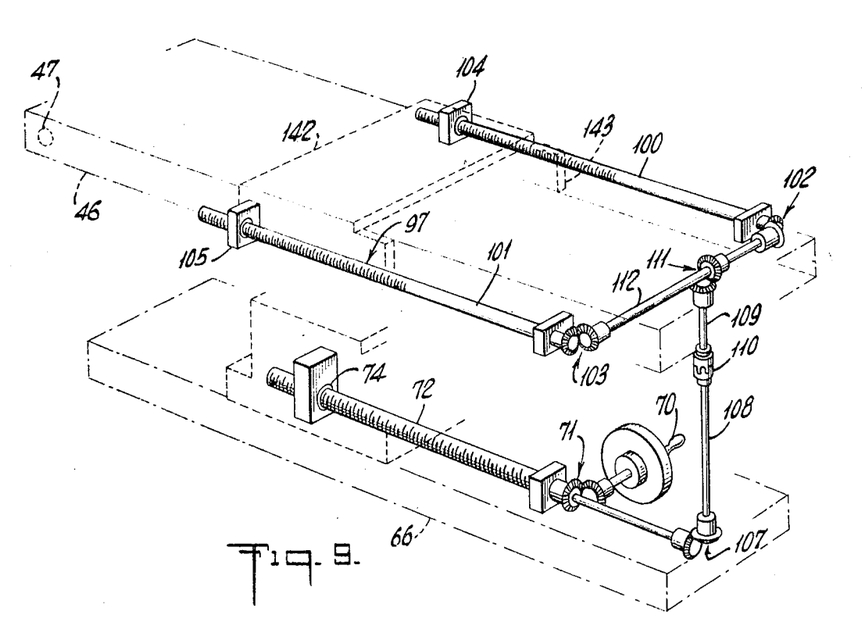
FIG. 9 is another isometric view to show the relation of parts of a transverse positioning adjustment mechanism of the invention.

In addition to the feed mechanism already described in connection with the printing device of the invention, all other aspects of the printing device are synchronized with basic drives of the collator. These other drives are made available to gearing at the operator's side of the machine by means of a shaft 60 running transversely between the back frame 10 and the front frame 10'. The particular means whereby shaft 60 gets its drive is unimportant to the invention, the main point being that this drive is synchronized with collator operation which in the present case is symbolized by drive to the collator web-feed drum 23. The shaft 60 is shown in FIG. 3, and the print-drive gear 60' (carried by shaft 60) is shown in FIG. 8, which schematically represents main drive interconnections. In FIG. 8, the synchronized relationship between operation of the main print-drive gear 60' and the collator web-feed drum 23 is suggested by phantom connections 61.

The details of various operator adjustments as to phase, change-gears, and the like, will be later described. It suffices for present purposes to indicate in connection with FIG. 8, that the actual operation of various elements in the print-mechanism is governed by the drive to shaft 62, all as derived basically from the described synchronizing gear 60'. Accurate location of print-impression with respect to cut-off margins is achieved by synchronized operation of cut-off mechanism 21 with printing and collating drives, as suggested by connection 21' in FIG. 8.

Print-hammer module

The print-hammer module 43, its support, its drive, and its adjustable positioning are best shown in FIGS. 2, 4, 5 and 7. The module carried in its own slide or frame, having a base 65 guidably positionable along transversely extending ways or slots 68 in a table or plate 66, forming part of the frame of the machine.

Figure 4:
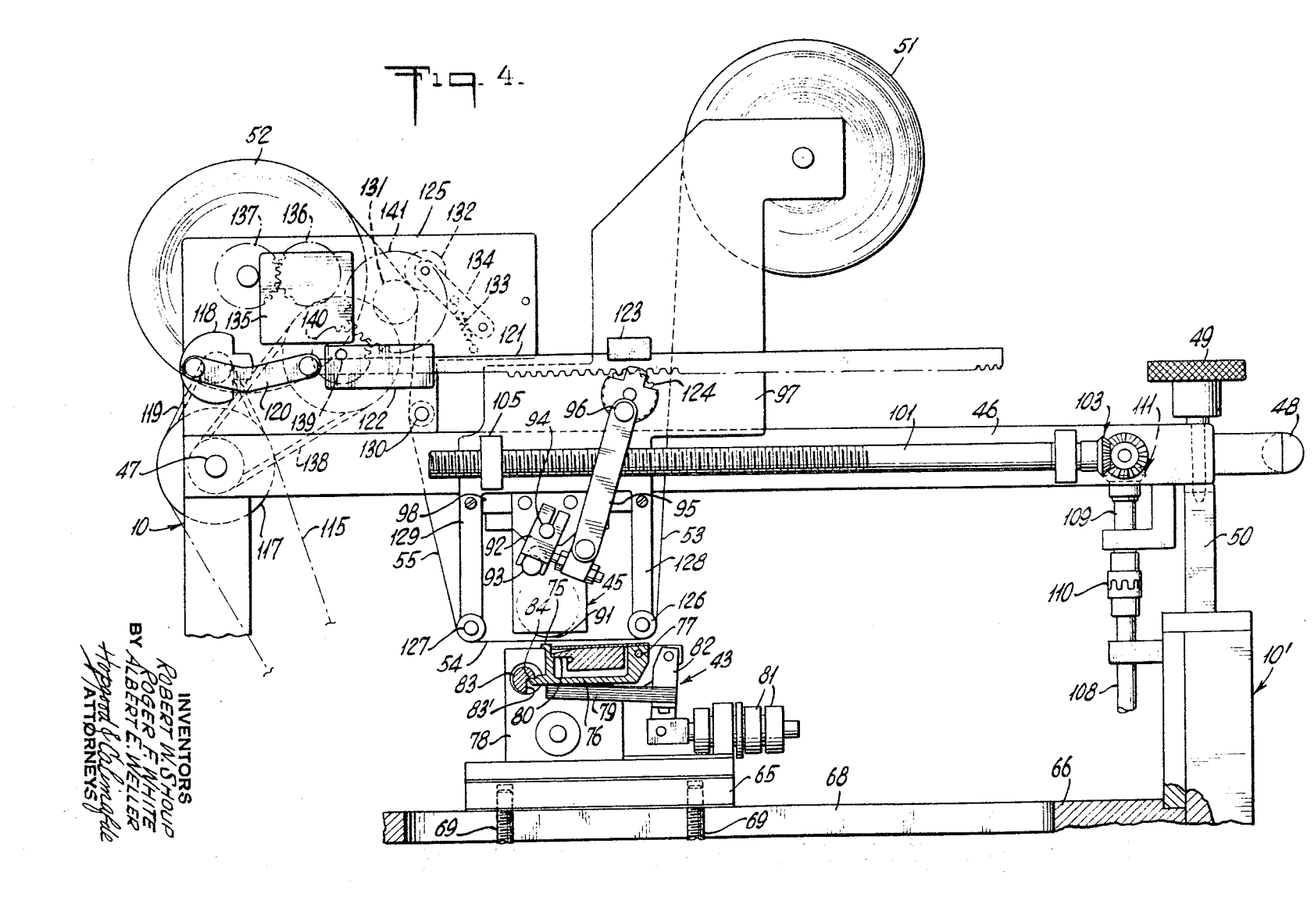
FIG. 4 is a further-enlarged side-elevation view similar to FIG. 2, and taken partly in section in the plane 4—4 of FIG. 3, showing print-hammer, ribbon-feed, and certain adjustment mechanism.

The plate 66 is shown provided with elongated parallel slots 67–68 serving as guides for depending means, such as bolts 69 threaded into the base 65 of module 43 (FIG. 4). By reference to FIG. 7, it is seen that considerable range of lateral adjustment for the base 65 of print-hammer module 43 is available via bolts 69 in the guide slots 67–68; for convenient manipulation, bolts 69 are shown with enlarged knurled heads 69' (FIGS. 2, 3). Positioning adjustment is achieved by means of a hand-crank 70 with bevel-gear connection at 71 to a transverse shaft 72; shaft 72 is journaled in the frame plate 66 and spans another elongated slot 73 (in plate 66) located between guide slots 67–68. Shaft 72 is threaded as a lead-screw and engages a traveler nut 74, forming part of a follower or tongue depending from the base 65 of the print-hammer module 43 (see FIG. 5).

In FIG. 4, the print-hammer itself is seen to comprise an anvil 75 projecting upwardly from the end of an arm 76, pivoted at 77 between spaced uprights or frames, as at 78. The anvil 75 is urged upwardly by a pre-loaded spring 79 against a stop, determined by a shoulder just beneath anvil 75 and interfering with the stop member 80 fixed with respect to the uprights 78. The compressional force of spring 79 is adjustably determined by setting lock-nuts 81 on a jacking mechanism for a pendulous support 82 for the springs 79.

Print-hammer tripping to achieve a striking blow for each print impression is governed by a re-cycling cam 83 journaled between the uprights 78 and continuously driven in synchronism with the web-feed mechanism already described. The cam 83 (for the situation depicted in FIG. 4) rotates clockwise, and commences with a slow rise, gradually increasing to a peak determined by a cut 83', at which point the heel 84 of the anvil rides off the cam to the limiting stop position already described in connection with the stop 80. In this process, the hammer has been driven with a controlled striking force and displacement, with respect (a) to the web and (b) to the print-impression face of the print-head 45, to create the desired transient crushing of the web for printing purposes. Continuous rotation of the cam 83, of course, immediately withdraws the hammer from the position shown in FIG. 4 so as not to interfer with the otherwise effectively continuous flight of the web.

Continuous drive to the cam 83 is effected at sprocket wheel (FIGS. 5, 7, 8) on the shaft of cam 83, and is directly taken from the already-identified subordinate drive-shaft 62 synchronized with web-feed advance. The particular drive connection is by way of an endless sprocket-chain 86 extending from a drive-sprocket wheel 87 on shaft 62 to a similar idler sprocket-wheel 88 journaled for rotation near the back frame 10 of the machine. An intermediate idler 89 close to the drive-sprocket wheel 87 brings the two lengths of chain 86 into reasonable proximity so as to make available more usable space immediately beneath the support-table surface 44 for the web. The sprocket chain 86 is shown linked or coupled to the print-hammer cam sprocket-wheel 85 and positively engaged over a substantial part of its periphery by employment of an additional idler sprocket-wheel 90 journaled between the frame uprights 78 of the print-hammer module.

Print-head module

The basic structure of the print-head module 45 is contained within a rectangular prismatic housing supporting a row of discrete character wheels indexible to print position so that for any particular indexed relation of the character wheels a plurality of selected characters will be avialable in a single print-impression plane located just below the bottom edge of the print-head housing. The slight projection 91 will be understood to suggest the positioning of these characters, being located immediately opposite the plane of the hammer anvil 75 and, of course, immediately adjacent the collated web plies 26. The structure of the print-head module 45 includes provision for externally-actuated selection of particular characters, as, for example, sequential numbering in response to rotary oscillation of an input crank member 92 (FIG. 4). Crank 92 has a forked end in actuating engagement with a pin 93 forming part of the print module 45, and crank 92 pivots at 94. Crank 92 receives oscillating actuation that is synchronized to the web-feed mechanism already described, and is shown receiving its oscillating drive from a link 95, which is in turn connected to an eccentric 96.

Figure 6:
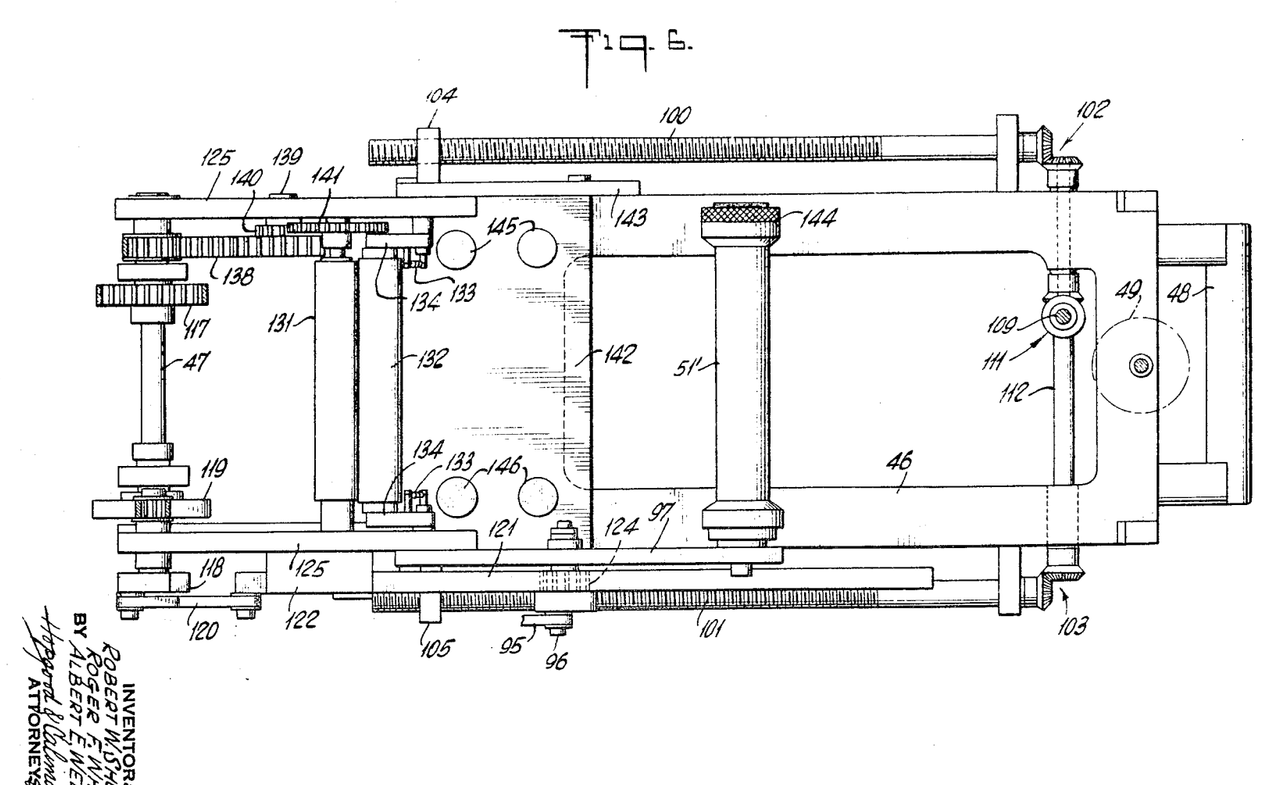
FIG. 6 is a plan view of the ribbon support and feed assembly which as a whole is hingedly articulated to the rest of the printing mechanism, as suggested by the spread between solid and phantom outlines in FIG. 2.

The print module 45 is secured to and forms part of a slide 97 guided on the upper frame 46 for transverse adjustable positioning with respect to the web, in accordance with the transverse adjustment of the print-hammer module 43. Basic transverse adjustment is made in a manner similar to and coordinated with the already-described transverse adjustment of the print-hammer module 43. As shown in FIG. 6, two-like lead-screws 100–101 carried in outboard bearing supports on the upper frame 46 are ganged by common bevel-gear connections 102–103 to drive the slide 97 via follower-nut engagements at 104–105.

Figure 5:
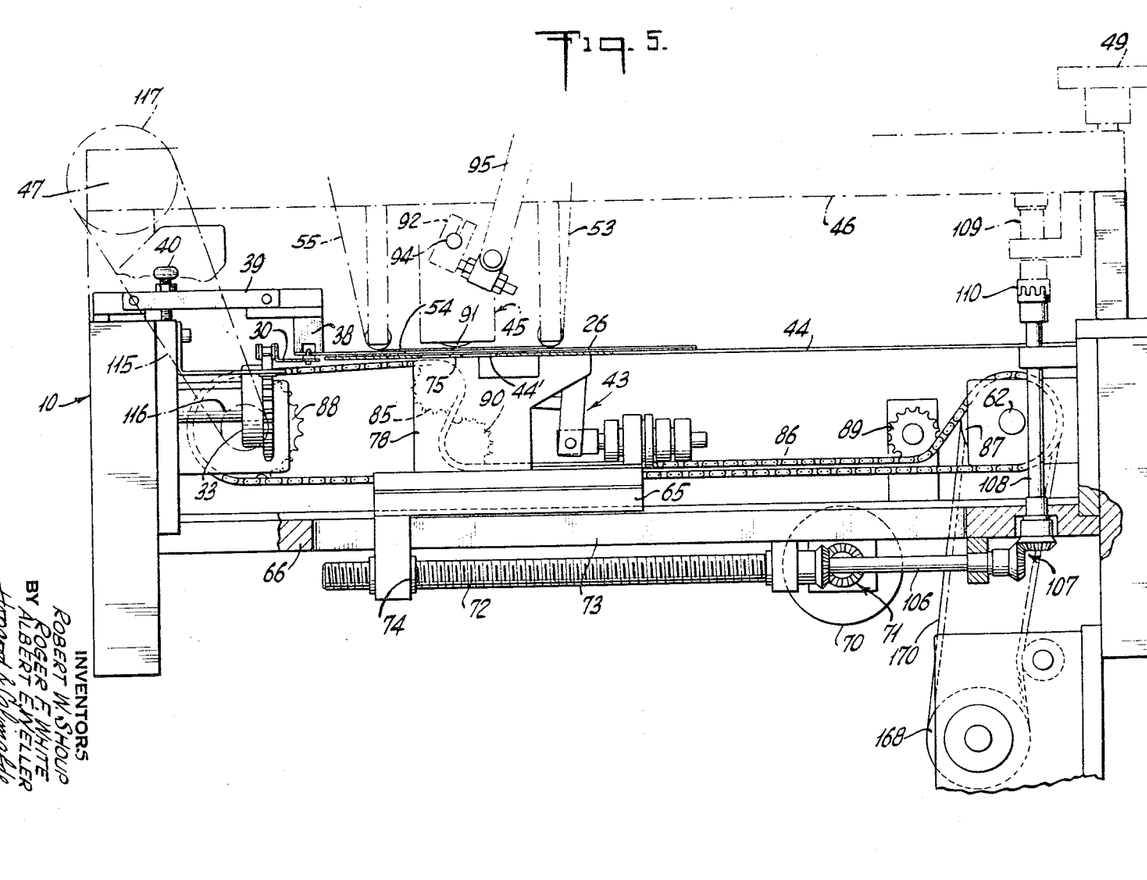
FIG. 5 is a view on the scale and from the aspect of FIG. 4 and more fully illustrating adjustment mechanism.
Figure 7:
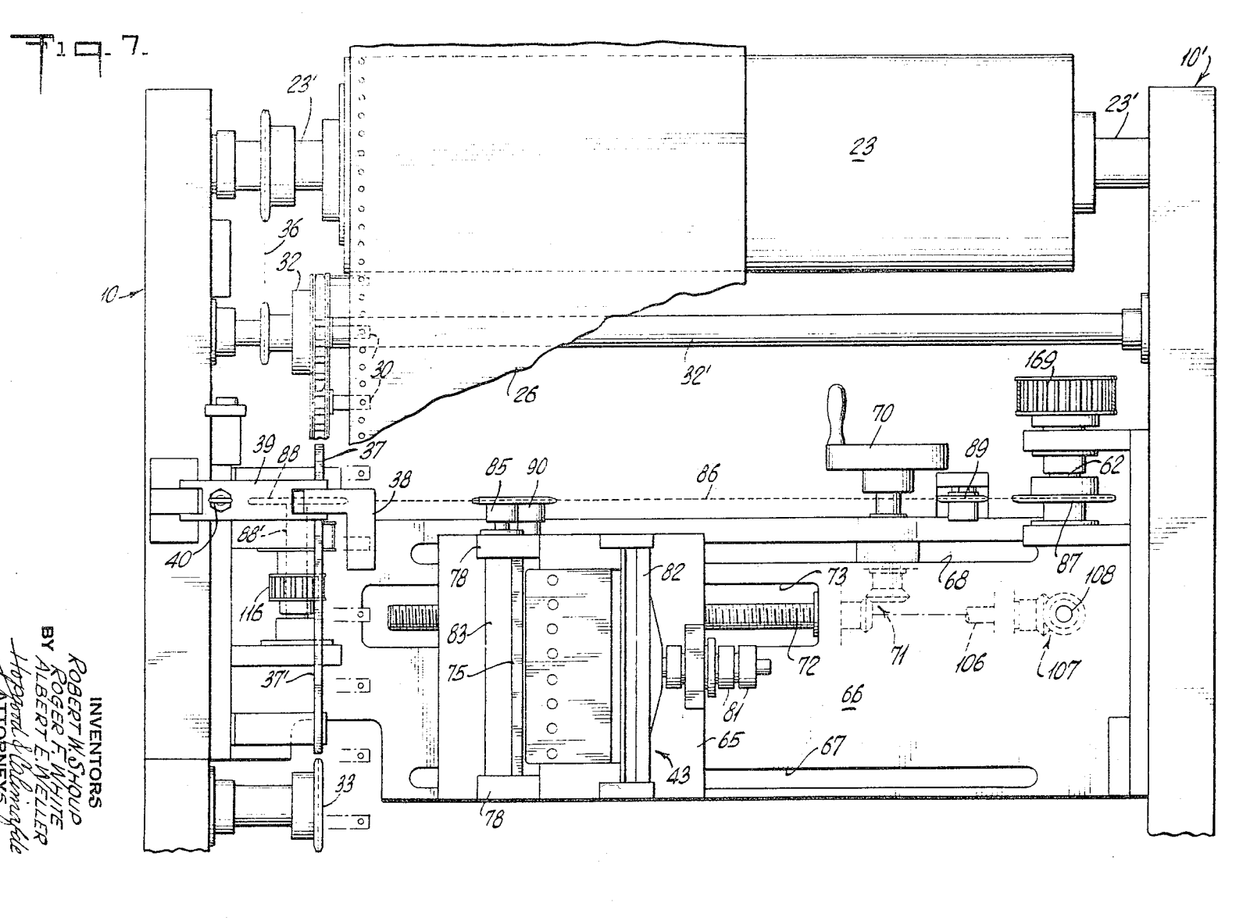
FIG. 7 is a plan view from the same aspect as FIG. 6 but with the articulated assembly of FIG. 6 removed, in order to reveal web-feed mechanism and web-support structure, in relation to print-hammer mechanism and certain of the adjustment means.

Actuation of the lead-screws 100–101 is derived by a vertical pick-off from the actuating mechanism driven by hand-crank 70 (see FIGS. 5, 7). This pick-off is accomplished by a shaft 106 representing an extension of the lead-screw 72 and driving a bevel-gear connection 107 to a vertical shaft 108 rising just above the plane of web-support (FIGS. 4, 5). Because this adjustment mechanism is shown at the operator's side of the machine, provision is made for disengagement of the adjustment parts for the upper and lower slides. Thus, shaft 108 has its counterpart at 109 in the upper-frame assembly based on member 46, and a dog-clutch 110 is shown connecting the two shafts 108–109 when the print mechanism is lowered and secured in its normal printing position, shown in FIG. 4. The shaft 109 has a bevel-gear connection 111 to the synchronizing shaft 112 which interconnects the drives to the two lead-screws 100–101.

It will be appreciated that, as long as the upper assembly is clamped in the down position, a single adjustment at hand wheel 70 will provide coordinated transverse positioning of the print-hammer module 43 along its guide and support means 66, at the same time and to the same degree as similar positioning of the upper slide 97 along its guide and support means 46. Of course, if the upper assembly 46 is pivoted to the raised position, as for some adjustment purpose in connection with the character-face setting in the print module 45, then the upper slide will retain its adjusted position in its lead-screws 100–101, so that when lowered to normal printing position, the dog-clutch elements 110 may engage and retain the coordinated transverse positioning adjustments of the modules 43–45.

For sequential numbering, effected by character-indexing in the printing head 45, it is, of course desired that this indexing occur in interlaced relation with the hammer-strike motion of anvil 75 beneath the printing head. This is achieved by utilizing the same drive mechanism for both of these functions and by maintaining the synchronism and synchronized phase-shifting thereof, regardless of the lateral adjusted positioning of the upper and lower slides. In the case of the number-indexing function which results from periodic actuation of the eccentric 96, basic input drive is achieved by a toothed belt or sprocket-chain connection 115 from the sprocket shaft 88' for the transverse sprocket 86 already described. Belt 115 thus connects a pick-off wheel 116 on shaft 88' to a driven wheel 117 on the shaft 47 which, it will be recalled, defines the hinge axis for the upper-frame assembly 46.

Rotation of shaft 47 drives an eccentric 118 through a toothed-belt connection 119 (FIG. 8), and the eccentric pin at 118 is linked by means 120 to a transversely reciprocable rack-bar 121, guided at 122 and 123 (FIGS. 2, 4). Rack 121 is in constant mesh with a pinion 124 which drives the eccentric 96, for print-character indexing. Eccentric 96, its drive pinion 124, and the guide means 123 are all carried by the transversely adjustable upper slide 97, but on the other hand, the basic rack reciprocation mechanism 118–120 and its guide means 122 are carried and supported by uprights, as at 125, constituting part of the fixed structure of the upper pivoted assembly 46.

It will be appreciated that by devising the print-hammer drive take-off sprocket-wheel 85 and the eccentric drive pinion 124 with the same pitch or effective pitch diameter, then the transverse lateral adjustment of both upper and lower slide assemblies can not only be kept coordinated as to position, regardless of the extent of the adjustment, but also as to timing the interlaced nature of print-hammer release with respect to character-indexing in the print head.

Ribbon-support and feed mechanism

It has already been generally indicated that ribbon material (as, for example, a plastic such as mylar, coated with cold dry magnetic printing ink) may be carried in a supply reel 51 and paid out over suitable idlers to a take-up spindle or spool 52. In the form shown, the supply spindle for reel 51 is carried by the transversely adjustable upper slide 97, and the take-up spindle for reel 52 is carried at the fixed upright structure 125 of the upper assembly 46. In FIG. 4, the ribbon is seen to be guided on the slide 97 between lower idlers 126–127, positioned by standards 128–129, forming part of the slide 97.

A further idler 130 is journaled in the fixed end 125 of the upper assembly and passes used ribbon over a drive pulley or ribbon-advance metering roll 131 to which the ribbon is squeezed by a pressure roll 132. Pressure on roll 132 is developed by spring means 133 anchored to the frame member 125 at one end; at the other end, spring means 133 are connected to arms 134, pivoted on frame 125 and carrying the pressure roll 132.

A continuously energized stalled-torque motor 135 applies constant take-up torque to the take-up spool 52. In the form shown, this is accomplished through gearing 136 from the output shaft of motor 135 to a spur gear 137 on the take-up spindle 52. Actual ribbon movement is determined by incremental feed imparted by metering action at the drive roller 131. In the form shown, this is accomplished by a toothed-belt take-off 138 from shaft 47 to an intermediate drive shaft 139 having a gear 140 in constant mesh with gear 141 for operating the ribbon-advance metering roll or drive cylinder 131. Preferably, all connecting and meshing relationships in the drive train to the ribbon-advance metering roll 131 are characterized by step-down ratios, so that ribbon-feed metering can be characterized by slow continuous movement, consistent with an economical consumption of fresh ribbon pigment.

For simplicity of description, the upper slide 97 has been generally indicated, whereas in fact the part thus identified is but a single upstanding side plate of that slide, the rest of the slide being visible in FIG. 6. The upper slide thus additionally includes a plate 142 extending horizontally across and slidably supported on the upper pivoted frame 46. Plate 142 carries a lateral guide-shoe 143 on one side and the already-described upwardly extending side plate 97 on the other side, so that plate 97 additionally serves a guide-shoe function, corresponding to that of the shoe 143. A bottom plate 98 (FIG. 4) forms part of the upper slide; plate 98 faces the lower surface of frame 46 and extends between shoes 143–97 to complete the guided support of the upper slide. It will be understood that a plurality of clamp bolts or thumb-screws 145–146 will serve securely to anchor the upper slides 97–142 in its adjusted position along the upper pivoted frame 46, by so jacking plate 142 as to clamp bottom plate 98 firmly against the underside of frame 46.

Further, in FIG. 6, the supply spindle 51′ for the supply reel 51 is shown supported at one end only, namely, on the upright 97 so as to present an open end over which a new reel may be inserted to replace a consumed one. Securing means at 144 will be understood to hold the installed supply reel 51 in place.

Drive adjustments

It has been previously noted that adjustments in the drive to the described print mechanism are made between the drive pick-off 62 and the basic drive gear 60′, which takes its motion and power from the transverse shaft 60 (see FIGS. 3 and 11); this drive train is somewhat schematically shown at the bottom-right corner of FIG. 8. Greater detail for this mechanism and its connection to the shaft 62 (for driving the sprocket-chain 87) will be described in connection with FIGS. 8 and 10–13.

In FIGS. 10–13, an intermediate drive-shaft 149 is shown journaled in a frame part 150 on the operator's side of the machine. Drive to this shaft 149 is accomplished through dual sets of change gears, utilizing the drive gear 60′ in connection with a first meshing gear 151 as the first train, and a second gear 152 carried with gear 151 and forming part of the second train to gear 153 on the intermediate drive-shaft 149. Such positioning adjustment as may be necessary for the idler shaft for gears 151–152 is made by supporting the same on a movable plate 154, adjustably secured against the frame 150, as dictated by the need to mesh with both gears 60′ and 153. A second intermediate drive-shaft 155 is journaled in the frame and carries a bevel gear 156, which in turn is journaled for rotation on shaft 155 and meshes with a bevel pinion 157 on the first intermediate drive shaft 149.

Figure 10:
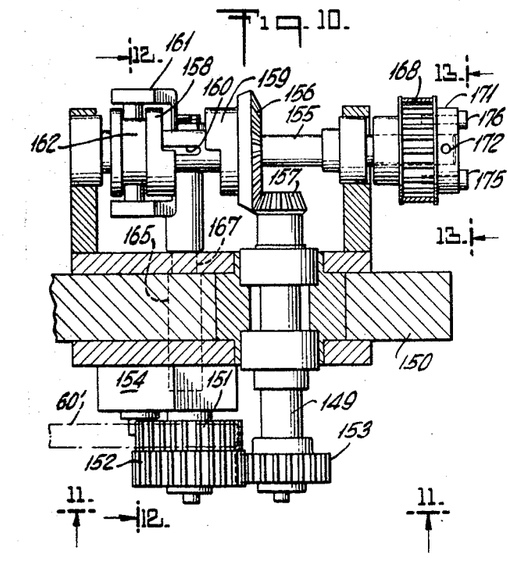
FIG. 10 is an enlarged fragmentary view in partial section to illustrate drive-synchronization adjustment, involving drive parts appearing in the lower-right portion of FIG. 8.
Figure 11:
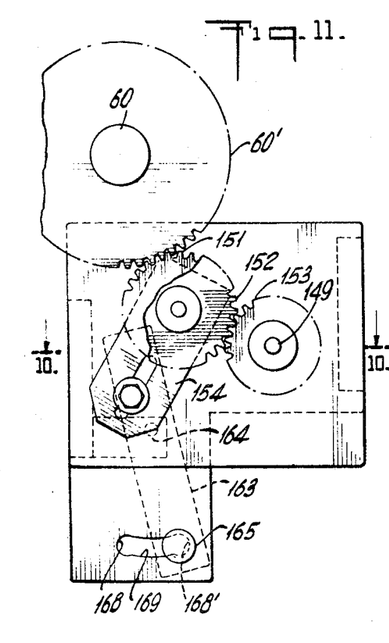
FIG. 11 is a view in elevation of the mechanism of FIG. 10, as viewed from the aspect 11—11 of FIG. 10, and showing at 10—10 the general plane of the sectioned portion of FIG. 10.
Figure 12:
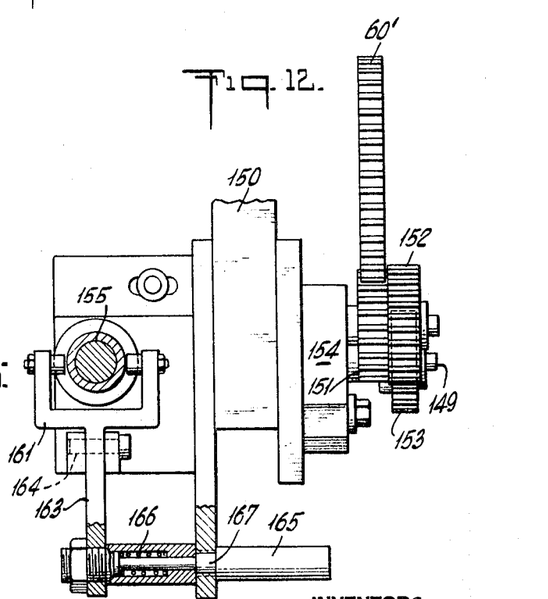
FIG. 12 is another view in elevation of the mechanism of FIG. 10, certain parts being sectioned in the general alignment 12—12 of FIG. 10.
Figure 13:
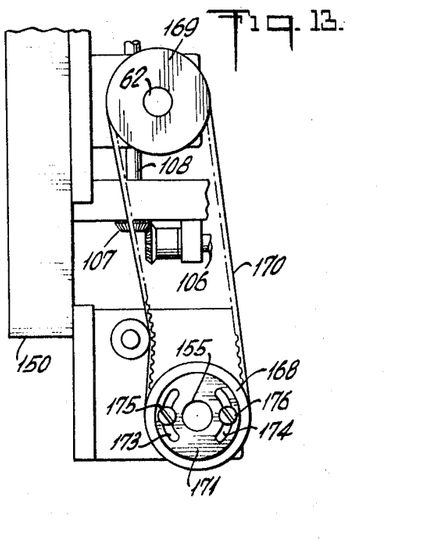
FIG. 13 is a view similar to FIG. 12 but on the aspect opposite from that of FIG. 12, namely from the aspect 13—13 of FIG. 10.

Normally, the first and second intermediate drive-shafts 149–155 are interconnected through dog-clutch means having mating halves 158–159, the latter being shown as part of the driven bevel gear 156. As depicted in FIG. 10, the clutch half 158 is disengaged from its mating half and, at the same time, the keyed engagement of clutch half 158 to shaft 155 is suggested by the groove 160. A shifter fork 161 engages a shift groove 162 in the clutch half 158. Fork 161 constitutes one end of a shift arm 163 pivoted to the frame at 164 and actuated into the engaged or disengaged position by means of a hand-crank 165 at the lower end of the arm 163. The handle 165 is of the variety which is spring-urged at 166 to position one end 167 thereof in one of two circular enlargements 168–168′ at the respective ends of an arcuate slot 169. The dimensions of the slot 169 being reduced in the length or span between the enlargements 168–168′ to provide a means whereby a selected positioning of the clutch may be retained. Preferably, the separate halves 158–159 of the dog-clutch elements are so related to each other that there is but one possible relative angular location of dog-clutch engagement, thus avoiding any ambiguity of angular relationship between the first intermediate drive-shaft 149 and the second intermediate drive-shaft 155 whenever the two are engaged.

Finally, the output of the intermediate drive-shaft 155 is relayed to a take-off toothed wheel or sprocket 168 by way of an adjustment mechanism to be described. Wheel 168 is connected to its corresponding wheel 169 on shaft 62 by toothed-belt or equivalent means 170.

The adjustment means for establishing the connection of take-off toothed wheel 168 to intermediate drive shaft 155 comprises a first hub-member 171 pinned at 172 to the shaft 155, and having a face adjacent an inner web face of wheel 168, with provision for limited relative angular adjustment of hub 171 with respect to sprocket 168. This angular adjustment is suggested in FIG. 13 wherein like opposed arcuate slots 173–174 are seen formed in the hub-member 171, and securing bolts 175–176 tapped into the web of toothed-wheel 168 are clamped in adjusted position, within slots 173–174 and against the outer face of the hub 171. Such limited angular adjustment permits a degree of phase control in the timing of print-hammer actuation; such adjustment is useful to permit the operator to set up the machine with assurance of print-impression at the correct location within a prescribed area of the web, in relation to the margins determined at cut-off.

Conclusion

It will be seen that we have described an improved printing mechanism which lends itself to in-line operation in conjunction with collating and cut-off functions. The basic precision achievable only with intermittent print action is realized on a continuously moving web, which may be a collated set of plies. In use, it has been possible with our invention to produce sequentially indexed magnetically printed sets, of bank-check size, at 200 per minute, without impairing the character fidelity required by MICR-numbering standards. Wastage is reduced and customer-satisfaction is enhanced by an ability to print after collation and before cut-off.

When it is desired to remove the print function, as for example to run merely collating and cut-off functions on the machine, the upper assembly 46 is simply raised (and held, by means 48′) and clutch handle 165 shifted. For particular job set-ups, the change gears 151–152 are readily accessible, as is also the phase-adjustment at 175–176, and the transverse-positioning adjustment at 70, all without loss of interlace synchronism as between print-hammer and character-index functions. The unambiguous configuration of clutch-halves 158–159 assures no loss or ambiguity of phase-adjustment for a given job set-up, even though the machine may have been operated while clutch 158–159 was disengaged.

Although the invention has been described in detail for the preferred form shown, it will be understood that modifications may be made without departing from the scope of the invention as defined in the claims which follow.

What is claimed is:

1. In a printing machine, a frame including a table portion establishing a plane of web support and of print-impression transfer and accommodating continuous web in a single direction of movement in said plane between a feed location and a cut-off location, a printing head carried by said frame and having an impression face on one side of and in facing relation with said plane and at a printing location in the region between said feed and cut-off locations, print-hammer means carried by said frame on the opposite side of said plane and in facing registration with the impression face of said head, said print-hammer means including means actuating the same for re-cycled transient approach to and retraction from said impression face, web-feeding means at said feed location and including means for positively located direct driving engagement with the web, web cut-off means at said cut-off location, said feeding means and the web being effectively disengaged at substantially the printing location, there being no feeding engagement with said web between said printing and cut-off locations, and continuous drive means including synchronized connections to said web-feeding means and to said print-hammer means and to said cut-off means, whereby the effective disengagement of the web from said feeding means at substantially the printing location assures a predetermined degree of slack in the web at the printing location, so that continuous flight of the web from said feeding means to said cut-off means is unimpaired by transient localized arrest of a portion of the web on the occasion of each print-impression transfer.

2. A printing machine according to claim 1, in which said table portion has a localized opening accommodating at least the area of coaction between said printing head and said print-hammer means, said table portion including web-support areas on both longtiudinal sides of said coaction area.

3. A printing machine according to claim 1, in which said table portion has a localized opening accommodating at least the are of coaction between said printing head and said print-hammer means, said table portion including web-support areas on both lateral sides of said coaction area.

4. A printing machine according to claim 1, in which the web is of the variety having spaced feed apertures along at least one longitudinal edge thereof, said feed means including spaced tapered feed pins fully engaging said apertures for positively located web drive at the feed location, and said pins being at least partially retracted from such full engagement at the longtiudinal region of said printing location.

5. A printing machine according to claim 4, in which said feed means includes a sprocket chain carrying said pins at spaced locations, frame-based means guiding a first length of said chain at said feed location and at an elevation with respect to said plane such that said pins are elevated for full-aperture engagement, said frame-based means guiding a second and adjacent length of said chain along an incline so deviating from the orientation of said first length as to assure at least partial retraction of said pins from such full engagement at the longitudinal region of said printing location.

6. A printing machine according to claim 1, in which the synchronized connection of said drive means to said print-hammer means includes phase-adjustment means, whereby the longtiudinal print-impression placement on the web may be adjustably selected in terms of the ultimate cut-off edges achieved by operation of said cut-off means.

7. A pinting machine according to claim 1, in which said printing head includes an indexible plurality of characters successively indexible into the plane of said impression face, and means including a synchronizing connection to said drive means for indexing said characters in interlaced timed relation with the transient actuated operation of said print-hammer means.

8. A printing machine according to claim 1, in which the frame-based support of said printing head includes elongated guide means extending transversely of the longitudinal alignment of web movement, and means for adjustably positioning said printing head along said guide means.

9. A printing machine according to claim 1, in which the frame-based support of said print-hammer means includes elongated guide means extending transversely of the longitudinal alignment of web movement, and in which said adjustable positioning means further positions said print-hammer means along its guide means, whereby said printing head and said print-hammer means are maintained in registry regardless of transverse adjustment.

10. A printing machine in accordance with claim 1, in which the frame-based support of said printing head includes an auxiliary frame hingedly related to the machine frame on a generally longitudinally extending axis on one lateral side of the path of web movement, whereby access to both sides of the printing region, namely to the cooperative parts of the print-hammer means and of the printing head, is facilitated.

11. In a machine of the character indicated, a frame including table means establishing a general plane of web support, collating means including plural roll-feed and support means supplying continuous individual plies of web into adjacency in said plane, web cut-off means carried by said frame at a cut-off location in said plane, said collating means including web-feed means at a feed location in said plane, said table means establishing a plane of web support and of print-impression transfer and accommodating continuous collated web in a single direction of movement in said plane between said feed location and said cut-off location, a printing head carried by said frame and having an impression face on one side of and in facing relation with said plane and at a printing location in the region between said feed and cut-off locations, print-hammer means carried by said frame on the opposite side of said plane and in facing registration with the impression face of said head, said print-hammer means including means actuating the same for re-cycled transient approach to and retraction from said impression face, said web-feeding means including means for positively located direct driving engagement with the web, said feeding means and the web being effectively disengaged at the printing location, there being no feeding engagement with said web between said printing and cut-off locations, and continuous drive means including synchronized connections to said collating means and to said print-hammer means and to said cut-off means, whereby the effective disengagement of the web from said feeding means at the printing location assures a predetermined degree of slack in the web at the printing location, so that continuous flight of the web from said feeding means to said cut-off means is unimpaired by transient localized arrest of a portion of the web on the occasion of each print-impression transfer.

12. A machine according to claim 11, in which said printing head includes an indexible plurality of characters successively indexible into the plane of said impression face, said continuous drive means including a single drive pick-off providing synchronized drive to said print-hammer means and to said printing head for indexing said characters in interlaced timed relation with the transient actuated operation of said print-hammer means, said single drive pick-off including a clutch, whereby print-hammer and character-index functions may be disengaged and re-engaged without impairing the synchronized connection determining interlaced performance of said functions, even though the collating and cut-off functions may have been performed during a period of clutch-disengagement.

13. A machine according to claim 12, in which said printing head includes ribbon support and feed means for interposing ribbon material between said impression face and the adjacent surface of collated web material, said single drive pick-off including a drive connection to said ribbon-fed means.

References Cited

UNITED STATES PATENTS

| | | | |
|---|---|---|---|
| 546,427 | 9/1895 | Norcross | 101—113 X |
| 1,254,988 | 1/1918 | Crouse et al. | 101—113 |
| 1,925,586 | 9/1933 | Fulk | 270—1 |
| 2,187,722 | 1/1940 | Wyrick | 270—1 X |
| 2,682,833 | 7/1954 | Gardinor | 101—113 |
| 2,788,208 | 4/1957 | Pearce | 270—1 |
| 2,915,965 | 12/1959 | Persak | 101—90 |
| 3,194,154 | 7/1965 | McKeag | 101—288 |

WILLIAM B. PENN, Primary Examiner